Patented May 16, 1944

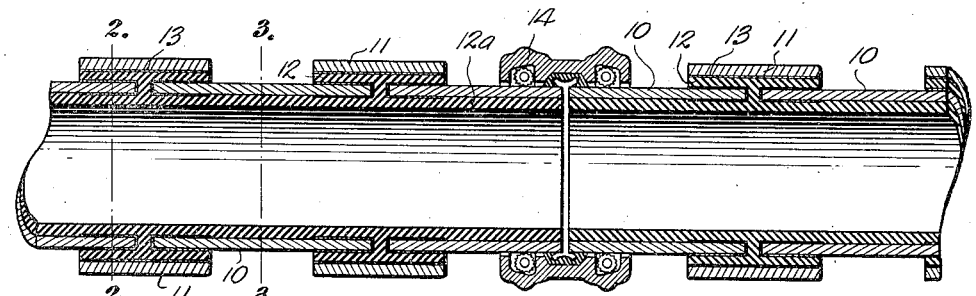

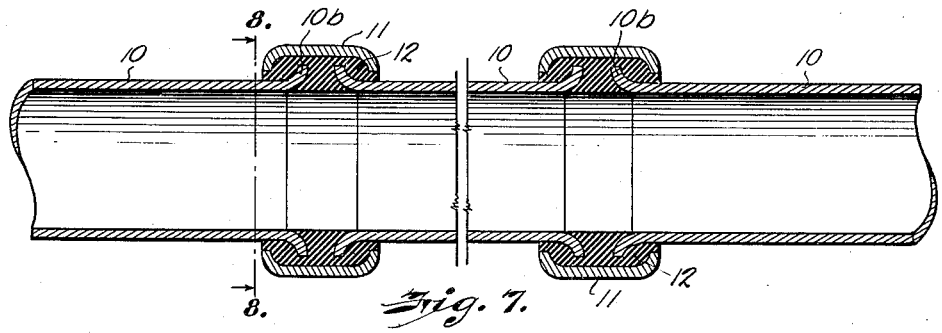
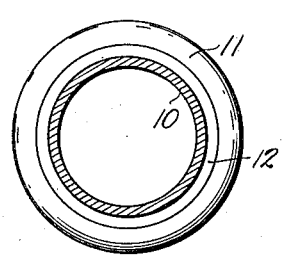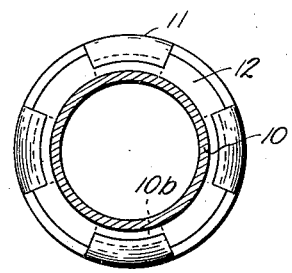
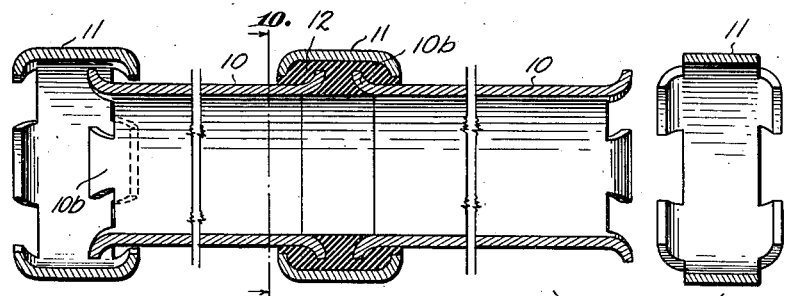
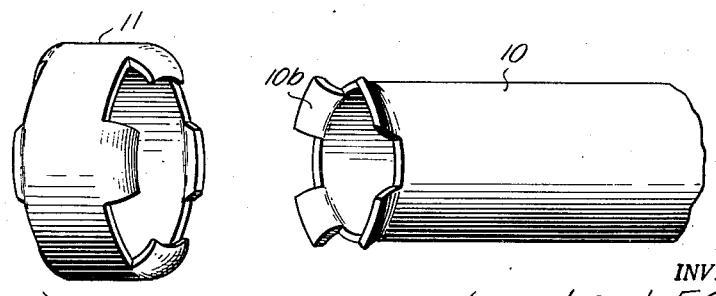

2,349,016

UNITED STATES PATENT OFFICE 2,349,016

ARTICULATE PIPE OR CONDUIT

Joseph F. Stephens, Kansas City, Mo.

Application October 22, 1942, Serial No. 462,953

9 Claims. (Cl. 138—62)

This invention relates to improvements in an articulate, shock-proof pipe or conduit and refers more particularly to a flexible and extensible pipe adapted for use where fluids, liquids or solids in suspension are to be transferred or conveyed under conditions where the conduit is subject to sudden distortion, bending, shock or vibration.

In marine construction, where fuel oil is to be transferred from the bunkers or tanks to the burners beneath the boilers, or in airplane practice, where highly inflammable and explosive liquids are piped from tanks to the engine, it is essential to employ conduits which are rugged and not susceptible to breakage from shock or vibration.

If the conduit is too rigid, it will not stand shock occasioned by explosion or distortion occasined by collision. Furthermore, the pipe must have sufficient structural strength to withstand considerable internal pressures imposed upon the fluids passing through the pipes by pumps or excessive pressures produced by pumps or other sources of pressure. Inherent strength is also necessary to take care of internal pressures from unusual causes such as constriction of the passageway due to bending, distortion or restricting of the size of the passageway for any cause.

Naval ships, auxiliaries, transport and cargo ships have been lost in this war because it was impossible to put out fires in the boiler rooms. These fires have been fed by the fuel oil lines which were broken or ruptured as a result of direct bomb hits or near misses, buckling and distorting hull plates or bulk heads to which the lines were rigidly affixed. No satisfactory means of controlling or extinguishing fires of this kind has been found and it is thought that the only possible solution of the problem is to create fuel piping systems that can much better withstand the effect of explosive forces. If this is to be accomplished the piping itself must be both flexible and extensible so that it can assume the shape or position to which it may be thrust without parting or rupturing. At the same time it is desirable that the line be constructed of metal so that its exposed external surface is armoured against the penetration of splinters, flying bolts, rivets, etc.

A similar need for a flexible and extensible pipe or conduit exists for use aboard aircraft on both hydraulic and fuel lines. There is considerable warpage of the surfaces to which such lines may be attached in normal operation of the plane. Such surfaces may be radically deformed by the effects of machine guns or cannon fire. It is also desirable that the exterior of the conduit have metal protection which precludes the use of flexible conductor such as hose. In aircraft construction there is need for piping or conduit that will not transmit vibration to all parts of the ship.

A further object of my invention is to provide a shock resisting conduit construction for the conduction of liquids, gases, or solids in free flowing form, that is capable of being bent and elongated without loss of contents even when such contents are confined under considerable pressure.

In the accompanying drawings which form part of the instant specification and are to be read in conjunction therewith and in which like reference numerals are used to indicate like parts in the various views, Fig. 1 is a longitudinal section of two coupled lengths of pipe, employing the invention, Fig. 2 is a cross sectional view, taken along the line 2—2 in Fig. 1, Fig. 3 is a cross sectional view taken along the line 3—3 in Fig. 1.

Fig. 4 is a modified form of the invention in which a reinforcing wire is employed, Fig. 5 is a cross sectional view taken along the line 5—5 in Fig. 4, Fig. 6 is a side view, partly in section, showing a modified type of reinforcing ring for use in an articulate conduit, Fig. 7 is a longitudinal section of a modified form, in which the ends of the segments are upturned and the edges of the reinforcing ring turned inwardly to limit the extensibility of the conduit.

Fig. 8 is a cross sectional view, taken along the line 8—8 in Fig. 7.

Fig. 9 is a longitudinal section in which slots are cut in the edges of the segments and reinforcing rings to facilitate mounting of the rings over the adjacent ends of the segments.

Fig. 10 is a cross sectional view taken on the line 10—10 in Fig. 9,

Figure 12:
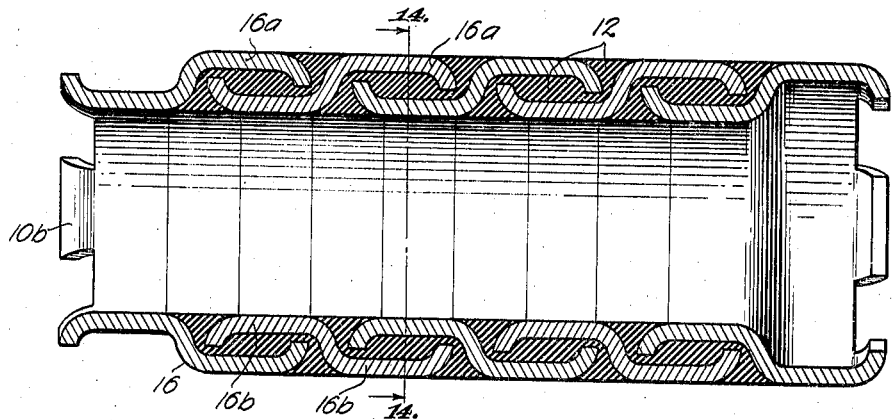
Figure 13:
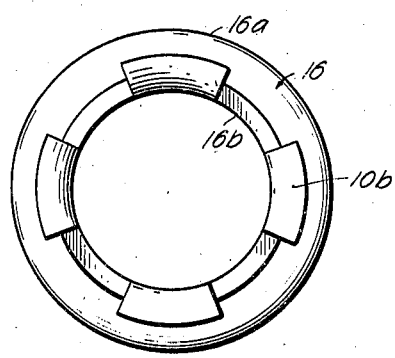
Figure 14:
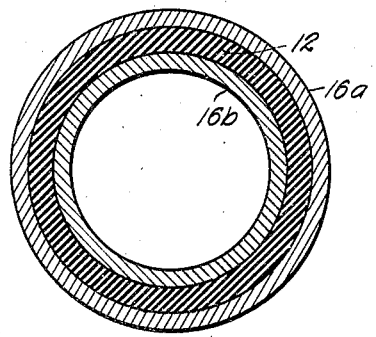
Figure 15:
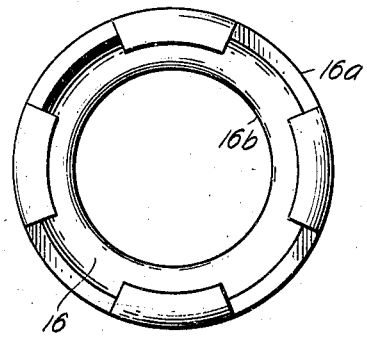

Fig. 11 is a perspective of the modification shown in Fig. 9, showing the segments and reinforcing rings in disassembled relationship, Fig. 12 is a further modification of the articulate conduit employing ring sections shaped with convex and concave portions for engagement with the adjacent rings, Fig. 13 is an end view taken from the left end of the conduit shown in Fig. 12, Fig. 14 is a view taken along the line 14—14 in Fig. 12, looking in the direction of the arrow, and Fig. 15 is a view taken from the right end of the conduit shown in Fig. 12.

To accomplish the results desired, it has been found necessary to construct the conduit by suitable bonding together with a resilient material such as synthetic rubber pipe sections or segments which loosely telescope and partially overlap. These sections are preferably constructed of high strength rigid material such as steel, aluminum or reinforced plastic, and are jointed to form an integrated, articulate conduit capable of angular misalignment at each joint and elongation of the resilient bonding material at each joint, making the entire structure flexible and extensible, while enabling it to yield to forces tending to thrust it into positions other than that which it originally occupied.

The metallic or rigid sections of the conduit, being interrupted and embedded at frequent intervals in the flexible material, offer impedance to transmission of vibration. Applicant is cognizant of prior attempts which have been made to supply a flexible tube or armored conduit exemplified by Patents No. 367,301 dated July 26, 1887 to Herbert Knight, No. 595,238 dated December 7, 1897 to Edwin T. Greenfield, No. 899,623 dated September 29, 1908 to George F. Royer, and No. 2,136,770 dated November 15, 1938 to Emil Witzenmann.

Referring now to the drawings and the construction shown in the first three figures, the articulate flexible or shock-proof conduit comprises a plurality of segments 10 which are short lengths of pipe of uniform diameter. These segments are arranged in alignment to form a continuous passageway and surrounding these segments at their ends or at the location where they are spaced apart, are positioned reinforcing rings 11. The spaces between the inner and outer tubular pipe sections or segments and between the adjacent ends of the inner sections are filled with synthetic rubber or other flexible substance 12 which, by cementing or brass-plating the metal segments and vulcanizing, firmly adhere to the metal surfaces.

In manufacturing the pipe and in molding the flexible material beneath the reinforcing rings, there may be molded as well a liner such as that shown as 12a in the interior of the segments. This tubular liner may, however, be eliminated entirely and the rubber limited within the annular space between the reinforcing rings and the exterior surface of the segments and between the ends of the adjacent segments. The placing of the flexible material will be determined by the service requirements in which the tubing or conduit is to be used. Normally, an interior lining of flexible material is unnecessary and is considerably more expensive than where the lining is dispensed with. As suggested, to obtain a successful bond between the metal reinforcing rings, the flexible material, and the flexible material and the exterior of the segments where aluminum tubing is being manufactured, it may be necessary to plate the interior of the reinforcing ring first with nickel, then with brass. In case of steel pipe, a plating of brass may be necessary to obtain an effective bond between the metal and the flexible material. This plating is diagrammatically shown in the drawings at 13.

To couple separate lengths of pipe, any suitable type of coupling may be used. In Fig. 1 there is shown the "Rolagrip" coupling 14, according to U. S. Patent 2,005,056.

In Figs. 4 and 5, the construction is similar to that shown in the first three figures, except that a reinforcing helical wire 15 is embedded in the flexible material in the space between the reinforcing ring and the external surface of the segments. To hold this wire in place, the surface of the segments is helically grooved or threaded to receive the reinforcing wire.

In the modification shown in Fig. 6, the reinforcing rings 11 have inwardly bent tongues 11a which extend into machined-out depressions 10a in the pipe and, by abutting against the edges of the grooves, limit the length to which the pipe may be extended thereby decreasing the likelihood of rupture at the joints of the segments. Such a limit would be established well within the ultimate elongation and strength of the synthetic rubber and well below the failure point of the bond between the synthetic rubber and the faces of the conduit sections.

In the modification shown in Figs. 7 and 8, the ends of the segments are upturned at 10b. The reinforcing rings 11 are then positioned over the segment joints and the flexible material injected or molded beneath the ring. After the flexible substance is in place, the ends of the reinforcing ring are bent inwardly and serve as limiting abutments against the flared ends of the segments controlling the distance that the flexible substance at the segment joints can be extended. In a like manner, the modification shown in Figs. 9–11 inclusive has provision for limiting the extensibility of the segment joints. In this modification, the adjoining ends of the segments are flared and slotted and corresponding slots are cut in the inwardly turned ends or edges of the reinforcing ring. Thus, by causing registration of the intermediate tongues between the slots on the reinforcing ring with the slots in the flared edges of the segments, the reinforcing ring can be moved along the pipe segments to positions over the segment joints. Then, before injecting or molding the flexible substance beneath the rings, the rings are rotated so that the inwardly bent tongues on the reinforcing rings are out of registration with the slots on the flared ends of the segments. When in this position, the tongues of the reinforcing rings will cooperate with the upturned edges of the segments to limit the longitudinal movement of the segments and stretching of the flexible substance beneath the rings.

In the modification shown in Figs. 12–15 inclusive, the pipe segments and reinforcing rings are integrally formed from a single unitary piece of pipe section, designated as a whole by the numeral 16. The pipe segment is formed concave in shape as shown at 16a, overlapping and overlying the convex ring section 16b of the adjacent pipe section 16. Injected or otherwise molded into the space between the pipe segments 16a and ring sections 16b and presenting a plane cylindrical surface inside and outside of the articulate conduit is the flexible material 12.

As shown in Fig. 12, this type of pipe utilizes a single formed tubular section, the end of one section fitting into the larger diameter end of the adjacent section. Interlocking of the sections is accomplished by rolling inwardly the convexed portions or inward flanges after the sections are telescoped, or by bayonet or tongue and notched joints in the inner and outer flanges of the adjoining sections. In Fig. 12, there is shown two methods of joining the pipe sections. In the central portion of the pipe the telescoping sections have the rolled-in flanges, while the ends of the pipe are equipped with the bayonet or tongue and notched joints for uniting the separate sections. In assembling the bayonet or tongue and notched sections, the tongues are brought into registration with the notches so that the smaller end of the section is passed into the larger end of the other section. The sections are then rotated out of registration and the flexible material injected into proper molding devices such as cores and outer molds to form the inner and outer surfaces of the pipe.

One method of manufacture may be described as follows: Upon a bare mandrel having an outside diameter approximately equal to the inside diameter of the inner tube sections are mounted the segments of pipe constituting the inner section. If an inner flexible lining or tube is to be formed, the inner sections will be mounted with the desired spaced relationship from the mandrel to form the lining. Strips of synthetic rubber of the appropriate width and thickness are wrapped around the mandrel to fill the annular space which forms the lining. A second strip of synthetic rubber having a width approximately equal to the axial length of the outer reinforcing rings or sections and having a thickness approximately equal to the space between the outer and inner sections, is wrapped around the filler strip and evenly positioned with respect thereto. The outer sections or reinforcing rings are then passed over the assembly to positions surrounding each joint. If cement is to be used for securing the necessary bond between the synthetic rubber and metal sections, it should be applied to the faces of the metal sections to which the bond is to be made. If brass plating is employed to obtain the necessary adhesion when vulcanization takes place, these same faces should be brass plated before placing them on the mandrel and prior to applying the synthetic rubber. Similarly, in the case of aluminum pipe, the bond is obtained by first nickel-plating the bonding faces and then brass-plating them. The entire assembly thus formed is then placed in a mold and vulcanized or cured.

An alternate method of manufacture would be by the recently developed injection process. In this process, the outer and inner sections or segments are placed in their relative positions shown in Figs. 1, 4, 6, 7, 9, and 12, and placed within a suitable mold so formed as to totally enclose the spaces which are to contain the synthetic rubber. These spaces are then filled by injection of the rubber under pressure, whereafter the entire assembly is vulcanized. In this process, the metal faces to which a bond is to be effected with the synthetic rubber are previously coated with cement or plated as above described.

In each of the modifications, where the reinforcing rings serve also as limiting members for expansion of the segment joints, this provision is made to prevent undue stress upon the rubber or flexible substance used at the joints or rupturing of the pipe at this point.

While rubber has generally been indicated as the flexible material employed beneath the reinforcing rings and between the ends of the segments, it is contemplated as well that any type of flexible plastic or synthetic rubber, such as neoprene, Chemigum, Hycar, or other commercial plastics or synthetic fluids or gases may be employed.

The distance between the ends of the segments to a great extent determines the bending moment of the pipe and the strength of the conduit at the segment joint.

From the foregoing, it will be seen that my invention is well adapted to attain the ends and objects hereinbefore set forth, together with the advantages which are obvious and which are inherent to the structure.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A flexible articulate conduit comprising a plurality of adjoining, spaced apart pipe segments of uniform diameter forming a continuous passage, reinforcing rings surrounding the space between the pipe segments, and an integral flexible substance between the segments and beneath the reinforcing ring bonded to the pipe segments.

2. A flexible articulate conduit comprising a plurality of adjoining, spaced apart pipe segments of uniform diameter forming a continuous passage, reinforcing rings surrounding the space between the pipe segments, an integral flexible substance between the segments, beneath the reinforcing ring and forming a continuous tubular lining inside the segmented passage and bonded to the pipe segments.

3. A flexible articulate conduit comprising a plurality of adjoining, spaced apart pipe segments of uniform diameter forming a continuous passage, reinforcing rings of uniform diameter surrounding the end portions of adjacent pipe segments and the space therebetween, an integral flexible substance beneath the reinforcing rings and between the adjoining edges of the segments, said flexible substance bonded to the surfaces of the segments.

4. A flexible articulate conduit comprising a plurality of adjoining, spaced apart pipe segments of uniform diameter forming a continuous passage, said segments having their ends outwardly flared and slotted, reinforcing rings of greater diameter than the segments having inwardly bent ends slotted to correspond to the slots in the segments, said rings adapted to be moved to position surrounding the spaces between the segments by registration of the slotted edges of the rings with those of the segments and an integral flexible substance molded between the segments beneath the reinforcing rings when the slots of the rings are out of registration with the slots of the segments and bonded to the segments.

5. A flexible articulate conduit comprising a plurality of coaxial pipe segments forming a continuous passage, reinforcing rings surrounding the joints between the pipe segments, and an integral mass of flexible substance constituting a continuous bonding material forming a cushion between the ends of the adjoining segments and between the segments and the reinforcing rings.

6. A flexible articulate conduit comprising a plurality of coaxial pipe sections each having an integral reinforcing ring and forming a continuous passage, said reinforcing rings surrounding the joints between the pipe sections, and overlapping the adjacent pipe section, an integral mass of flexible substance constituting a continuous bonding material forming a cushion between the ends of the adjoining sections and between the sections and the reinforcing rings, 7. A flexible articulate conduit comprising a plurality of coaxial pipe sections forming a continuous passage, each pipe section having an end portion of enlarged diameter constituting a reinforcing ring and surrounding a portion of the adjacent pipe section, and an integral mass of flexible substance constituting a continuous bonding material forming a cushion between the ends of the adjoining sections and between the sections and the reinforcing rings.

8. A flexible articulate conduit comprising a plurality of coaxial pipe sections forming a continuous passage, each pipe section having an end portion of enlarged diameter surrounding a portion of the adjacent pipe section, the end of the underlying pipe section being flared and the end of the surrounding portion being bent inwardly to limit the axial movement of the pipe sections, and an integral mass of flexible substance constituting a continuous bonding material forming a cushion between the ends of the adjoining pipe sections and between the overlapping portions of the segments.

9. A flexible articulate conduit comprising a plurality of coaxial pipe sections forming a continuous passage, each pipe section having an end portion of enlarged diameter surrounding a portion of the adjacent pipe section, the end of the underlying pipe section being flared and slotted and the end of the surrounding portion being bent inwardly and slotted, said surrounding portion adapted to be sleeved on the adjacent pipe section by registration of its slotted edge with the slotted edge of said pipe section, and an integral mass of flexible substance constituting a continuous bonding material forming a cushion between the adjacent ends of adjoining pipe sections and between the overlapping portions of the sections.

JOSEPH F. STEPHENS.